(12) United States Patent
Evers et al.

(10) Patent No.: US 7,531,244 B2
(45) Date of Patent: May 12, 2009

(54) PLYWOOD, AND A PROCESS FOR PREPARING PLYWOOD

(75) Inventors: Lars Evers, Sittard (NL); Jozef Maria Johannes Mattheij, Sittard (NL)

(73) Assignee: DSM IP Assets B.V., Heerlen (NL)

( * ) Notice: Subject to any disclaimer, the term of this patent is extended or adjusted under 35 U.S.C. 154(b) by 29 days.

(21) Appl. No.: 10/582,133

(22) PCT Filed: Dec. 9, 2004

(86) PCT No.: PCT/EP2004/014153

§ 371 (c)(1), (2), (4) Date: Mar. 12, 2007

(87) PCT Pub. No.: WO2005/058991

PCT Pub. Date: Jun. 30, 2005

(65) Prior Publication Data

US 2007/0218306 A1    Sep. 20, 2007

(30) Foreign Application Priority Data

Dec. 18, 2003  (EP) ................................. 03078931

(51) Int. Cl.
*B32B 5/66* (2006.01)

(52) U.S. Cl. .................... 428/528; 428/535; 428/537.1; 427/324; 427/325; 427/408; 156/325; 156/330.9

(58) Field of Classification Search ................. 428/528, 428/535, 537.1; 427/324, 325, 408; 156/325, 156/330.9
See application file for complete search history.

(56) References Cited

U.S. PATENT DOCUMENTS 4,362,827 A * 12/1982 Tinkelenberg et al. ......... 524/9
5,684,118 A    11/1997 Breyer et al.

FOREIGN PATENT DOCUMENTS

WO    WO 01/38416      5/2001
WO    WO01/38416   *  5/2001

* cited by examiner

Primary Examiner—Leszek Kiliman
(74) Attorney, Agent, or Firm—Nixon & Vanderhye P.C.

(57) ABSTRACT

The invention relates to plywood, comprising at least two wood veneer layers and at least one adhesive layer, whereby the adhesive layer comprises a resin composition comprising a triazine compound (T), formaldehyde (F) and optionally urea, wherein the molar $F/(NH_2)_2$ ratio of the adhesive layer lies between 0.70 and 1.10 and the molar F/T ratio of the adhesive layer lies between 1.0 and 3.5. The invention further relates to a process for the preparation of plywood.

17 Claims, No Drawings

PLYWOOD, AND A PROCESS FOR PREPARING PLYWOOD

This application is the U.S. national phase of international application PCT/EP2004/014153 filed 9 Dec. 2004 which designated the U.S. and claims benefit of EP 03078931.7, dated 18 Dec. 2003, the entire content of which is hereby incorporated by reference.

The invention relates to plywood, comprising at least two wood veneer layers and at least one adhesive layer, whereby the adhesive layer comprises a resin composition comprising—in free form and/or in reacted form—a triazine compound (T), formaldehyde (F) and optionally urea.

Such a plywood, whereby the triazine compound usually consists essentially of melamine (M), is known from a.o. 'Plywood and Adhesive Technology' by Terry Sellers jr. (1985, Marcel Dekker Inc, New York (N.Y.) USA) and utilised on commercial scale.

The drawback of the known plywood is that the adhesive layer must contain a high amount of formaldehyde, leading to a molar $F/(NH_2)_2$ ratio in the adhesive layer of 1.2 or higher, in order to ensure that the mechanical properties such as the shear strength of the end product are sufficiently good to meet the standards that are in place. An example of such a standard is the Japanese Agricultural Standard JAS 987 2000, supplemented with notification of Feb. 27, 2003. The said high amount of formaldehyde in the adhesive layer can then lead to a high formaldehyde-emission (F-emission), which is undesirable as it can lead to health problems.

It is the objective of the present invention to significantly reduce the drawback of the known plywood, while still providing a plywood that has sufficient mechanical properties such as shear strength.

The said objective is achieved in that the molar $F/(NH_2)_2$ ratio of the adhesive layer lies between 0.70 and 1.10 and the molar F/T ratio of the adhesive layer lies between 1.0 and 3.5.

The advantage of the plywood according to the invention is that the amount of formaldehyde and the F-emission are lower than those of the known plywood having the same wood layers; yet the plywood according to the invention can still meet the stringent standards relating to mechanical properties such as shear strength, as laid down in for example JAS 987 2000, supplemented with notification of Feb. 27, 2003. It is a further advantage of the plywood according to the invention that the adhesive layer can be reduced in weight (usually expressed as $g/m^2$ per adhesive layer) compared to the known plywood, while still meeting the said stringent standards.

In WO 01/38416 A1, an adhesive composition for composite panels is disclosed; the adhesive composition comprises the reaction product of formaldehyde with urea and/or melamine having a molar ratio chosen such that it which will result in a formaldehyde emission in a composite panel of a desired level. In WO 01/38416 A1, an isocyanate must be added to the adhesive composition to reverse loss in physical and mechanical properties arising from use of the adhesive composition in the composite panel.

The plywood according to the invention comprises—as is known and common in plywood—at least two wood veneer layers and at least one adhesive layer. Within the context of the present invention, the term plywood refers both to the situation where the adhesive layer(s) is (are) not at all or only partly cured, as well as to the situation where the adhesive layer(s) is (are) almost fully or fully cured. The various compounds as present in the adhesive layer such as the triazine (eg melamine), formaldehyde and urea can thus be present in their free form but also in reacted or partly reacted form. Plywood comprising 5 or 7 or more layers, whereby the wood veneer layers and adhesive layers typically alternate and whereby commonly the face layers are wood veneer layers, are quite common. The wood veneer layers in plywood usually are a continuous phase, eg resulting from the process of peeling of a tree trunk. It is also possible that a wood layer, in particular an inner layer or a layer that will not be visible in its end application, consists of two, three, four or more pieces aligned next to each other. The definition of plywood in the present invention, however, does not embrace systems such as OSB (oriented strand board) where wood particles and adhesive are so mixed with each other that this mixture itself forms a layer and where the board is entirely made from such layers.

The thickness of the wood veneer layers according to the invention may be chosen according to common plywood practice, although the reduced F-emission of the adhesive layer according to the invention will allow the face layers, which are known to play a role in controlling the F-emission, to be thinner than in known plywoods while still providing a plywood with acceptable F-emission performance. Typical thicknesses of wood veneer layers in plywood range from about 0.4 mm up to about 5 or 10 mm or more.

The type of wood chosen in the plywood according to the invention may be chosen according to common plywood practice. Both soft woods as well as hard woods are being used in practice and can be used for the plywood according to the invention. Examples of wood types that may be chosen for plywood production are: soft woods like for example fir or pine; hard woods like for example red meranti or yellow meranti. However, since it is known that the F-emission of a plywood can have a relation with the nature of the chosen wood, it should be noted that the plywood according to the invention will allow certain wood types that are usually correlated with high F-emission plywoods—such as for example lighter-coloured meranti's such as yellow meranti—to become acceptable for applications where more stringent demands on F-emission are placed. Preferably, at least one wood layer in the plywood according to the invention contains yellow meranti or red meranti.

The plywood according to the invention comprises at least one adhesive layer. The adhesive layer comprises a resin composition, to be further described herein below. In addition, the adhesive layer according to the invention may—as is commonly done—comprise other compounds. Examples of such other compounds are: catalysts such as acids, water, fillers such as wheat flour, and formaldehyde-scavengers. The total amount of the other compounds as weight percentage of the adhesive layer may vary within wide limits, from about 1 or 2 wt. % to about 40 or 50 wt. %, although more commonly from about 10 wt. % to about 30 wt. %.

The adhesive layer according to the invention comprises a resin composition comprising—in free form or in reacted form—a triazine compound (T), which is preferably melamine (M), formaldehyde (F) and optionally urea. In general, such resin compositions are known and can be prepared by adding formaldehyde, the triazine compound and optionally urea to water to form a mixture, followed by letting this mixture react under suitable and known conditions of temperature and pH so as to form a resin. As is known, other compounds can be added to a resin in order to convey certain properties such as moisture resistance to the end product. Triazines suitable for use in the adhesive layer according to the invention should have at least one —$NH_2$ group; such triazines are known per se, such as for example melamine, ammeline, ammelide, melam, or melem. Since both the triazine (such as melamine) and urea contain —$NH_2$ groups, at least when they are in unreacted form, the resin composition—and thus also the adhesive layer—has a molar $F/(NH_2)_2$ ratio. Within the context of the invention and as is commonly done, the calculation of the molar $F/(NH_2)_2$ ratio is done by counting all —$NH_2$ groups, including those that may have reacted. Additionally, also —$NH_2$ groups originating from other compounds than urea and melamine such as for example other triazine compounds like melam or melem are included. The calculation of the molar F/T or F/M ratio of the resin composition and of the adhesive layer according to the invention is done by counting all triazine or melamine present, including triazine or melamine that may have reacted.

The adhesive layer according to the invention has a molar $F/(NH_2)_2$ ratio of at least 0.70 and at most 1.10. A molar $F/(NH_2)_2$ ratio of at least 0.70 ensures that the adhesive layer has sufficient gluing power, thus resulting in sufficient mechanical properties as exemplified in shear strength. Preferably, the molar $F/(NH_2)_2$ ratio is at least 0.74 or 0.78; more preferably, the molar $F/(NH_2)_2$ ratio is at least 0.80 or 0.82; most preferably, the the molar $F/(NH_2)_2$ ratio is at least 0.85.

As indicated earlier, it is important to ensure that the F-emission of the plywood according to the invention is as low as possible; this is achieved by ensuring that the molar $F/(NH_2)_2$ ratio of the adhesive layer is at most 1.10 or 1.08, preferably at most 1.05 or 1.0.

The adhesive layer according to the invention has preferably melamine as the triazine compound and a molar F/M ratio of at least 1.0, so as to ensure that the melamine as present can actually react with formaldehyde and thus to limit the amount of free melamine; free melamine does not contribute to the mechanical properties of the resulting plywood, although it may serve as scavenger. Preferably, the molar F/M ratio is at least 1.25 or 1.5; more preferably the molar F/M ratio is at least 1.75, most preferably at least 2.0.

In order to ensure that the adhesive layer has an excellent gluing power, even at low molar $F/(NH_2)_2$ ratios, the molar F/M ratio of the adhesive layer according to the invention is at most 3.5, preferably at most 3.25 or 3.0, most preferably at most 2.75 or even 2.50.

Preferably, the molar $F/(NH_2)_2$ ratios and the molar F/T and F/M ratios as given above also apply to the resin composition according to the invention. Preferably, at least a significant portion of the formaldehyde, urea and melamine as present in the adhesive layer originates from addition during preparation of the resin composition, thereby ensuring that the desired chemical reactions leading to a well-performing adhesive layer can indeed take place. Preferably, at least 60 wt. % of the melamine in the adhesive layer originates from addition during preparation of the resin composition; more preferably, this amount is at least 70 wt. %, even more preferably this amount is at least 80 wt. % and most preferably it is at least 90 wt. %. Preferably, at least 40 wt. % of the urea in the adhesive layer originates from addition during preparation of the resin composition; more preferably, this amount is at least 50 wt. % or 60 wt. %, in particular this amount is 70 wt. %, even more preferably this amount is at least 80 wt. % and most preferably it is at least 90 wt. %. Preferably, at least 80 wt. % of the formaldehyde in the adhesive layer originates from addition during preparation of the resin composition; more preferably, this amount is at least 90 wt. %, even more preferably this amount is at least 95 wt. % and most preferably it is at least 99 wt. %.

The adhesive layer according to the invention contains—prior to curing—an amount of water, at least originating from the resin composition. In other words, the adhesive layer according to the invention has a solids content, defined as the weight percentage of all compounds in the layer—except water—added together. It was found that the F-emission of plywood according to the invention reduces with increasing solids content of the adhesive layer prior to curing. Preferably, therefore, the said solids content is at least 50 wt. %, more preferably at least 60 wt. % or 65 wt. %, in particular at least 70 wt. % and most preferably at least 75 wt. % or even 80 wt. %.

As indicated above, the adhesive layer according to the invention may optionally contain urea. It was found, however, that the properties of the adhesive layer according to the invention—in particular the shear strength of the resulting plywood—are improved if the amount of urea is relatively low, so that a large portion of the —$NH_2$ groups in the adhesive layer are triazine-based. Preferably, the amount of urea in the adhesive layer according to the invention lies between 0 and 25 $g/m^2$ or between 2 and 23 $g/m^2$ per adhesive layer; more preferably, the amount of urea lies between 4 and 21 or between 6 and 20 $g/m^2$ per adhesive layer, in particular between 8 and 19 $g/m^2$ or 10 and 18 $g/m^2$ per adhesive layer, and most preferably between 12 and 17 $g/m^2$.

The adhesive layer according to the invention comprises a resin composition comprising a triazine compound, formaldehyde and optionally urea. Additionally, the adhesive layer according to the invention may optionally comprise other types of resins as well. Examples of such other types of resins are phenolic resins and pMDI or isocyanate resins. It is preferred, however, that the total amount of such other types of resins in the adhesive layer is less than 50 wt. % or 40 wt. %, more preferably less than 30 wt. % or 20 wt. %, in particular less than 10 wt. %, 5 wt. % or even 2 wt. % or 1 wt. %. Preferably, the adhesive layer according to the invention contains essentially no isocyanate or pMDI type of resins, or even essentially none of any of the said other types of resins. Preferably, the said amounts of other types of resins apply to all adhesive layers in the plywood according to the invention as a whole.

Plywood often comprises more than one adhesive layer. According to the invention, at least one of those adhesive layers has the composition and the molar ratios as defined above. Preferably, at least 50% of the adhesive layers have the said composition and molar ratios; more preferably, at least two-thirds or even 75% of the adhesive layers have the said composition. Most preferably, essentially all of the adhesive layers in the plywood according to the invention have the composition and the molar ratios as defined above. Preferably, the adhesive layers in the plywood according to the invention are fully cured, although it may sometimes be desirable or necessary that the plywood according to the invention is partially cured or almost fully cured.

As a result of the specific properties of the adhesive layer according to the invention, the plywood according to the invention can be constructed in such a way that stringent demands on F-emission can be met. Preferably, the plywood according to the invention has an average F-emission according to JAS 987 2000 which is at most 0.5 mg/l. As will be demonstrated in the Examples below, no unusual measures other than the specific molar ratios in the adhesive layer according to the invention need to be taken in order to achieve the said F-emission objective. More preferably, the average F-emission is at most 0.3 mg/l. This means that the plywood according to the invention can meet the F**** standard for type I plywood.

Although the plywood according to the invention has a lower F-emission than comparable known plywoods, its mechanical properties can nevertheless be sufficient to meet the requirements for practical use. This is exemplified by the shear strength, as laid down in JAS 987 2000. Preferably, the plywood according to the invention has a shear strength of at least 4 or 5 kg/cm², more preferably at least 6 or 7 kg/cm², in particular at least 8 or 9 kg/cm², most preferably at least 10 or 11 kg/cm². In general, the shear strength as required of the plywood according to the invention will lie at 40 kg/cm² or lower, mostly even at 30 kg/cm² or lower. As is known to the skilled person, it may be necessary to vary the amount of adhesive composition per adhesive layer in order to achieve the abovementioned values of shear strength.

The invention further relates to a process for the preparation of plywood, comprising the steps of:
a) preparing a resin composition comprising melamine (M), formaldehyde (F) and optionally urea;
b) preparing an adhesive composition, comprising the resin composition and optionally other compounds, whereby the molar $F/(NH_2)_2$ ratio of the adhesive layer lies between 0.70 and 1.10 and the molar F/M ratio of the adhesive layer lies between 1.0 and 3.5;
c) applying the adhesive composition to at least one side of a wood layer, whereby at least one adhesive layer is formed;
d) bringing the at least one adhesive layer into contact with a second wood layer so that a plywood is formed;
e) curing the plywood.

The preparation of the resin composition in step a) may be done by techniques that are as such known, whereby it must be ensured that the molar $F/(NH_2)_2$ ratio and the molar F/M ratio of the resin composition are such that the combination of the resin composition with the optional other compounds yields an adhesive layer having the molar ratios as specified in step b). Steps c), d) and e) may be done by common techniques, well known to the person skilled in the art of plywood manufacturing. As is known, it may be desirable or necessary that curing step e) is executed only partially, although preferably a full curing is done. It may be possible to use other types of resins than the resin as prepared in step a) is used in subsequent steps b) through e). Examples of such other types of resins are phenolic resins and pMDI or isocyanate resins. It is preferred, however, that the amount of such other types of resins in the adhesive composition, in the adhesive layer and in the resulting plywood is less than 50 wt. % or 40 wt. %, more preferably less than 30 wt. % or 20 wt. %, in particular less than 10 wt. %, 5 wt. % or even 2 wt. % or 1 wt. %. Preferably, the adhesive composition, the adhesive layer and even the entire plywood according to the invention contain essentially no isocyanate or pMDI type of resins, or even essentially none of any of the said other types of resins.

As a general rule, the shear strength of the plywood according to the invention will increase with an increasing amount of adhesive composition per adhesive layer. The amount of adhesive composition in an adhesive layer is commonly expressed in g/m² per adhesive layer. A typical known adhesive layer can contain about 275 to 450 g/m² or more adhesive composition. It is a characteristic of the adhesive layer according to the invention that the amount of adhesive composition in the adhesive layer can be reduced while still yielding plywood having sufficient mechanical properties such as shear strength. Alternatively, a similar amount of adhesive layer will generally yield plywood having a higher shear strength than the otherwise comparable known plywood. Preferably, therefore, the adhesive layer or layers according to the invention contain between 75 and 350 g/m² of adhesive composition per adhesive layer; more preferably, between 100 and 275 g/m², in particular between 110 and 250 g/m², more in particular between 120 and 225 g/m² and most preferably between 125 and 200 g/m² of adhesive composition per adhesive layer. It is even quite feasible that at most 175 or even at most 150 g/m² of adhesive composition per adhesive layer is sufficient to meet the requirements.

An example of a curing step is hot pressing, optionally preceded by a cold pressing step.

The plywood according to the invention, as well as its preparation, will be further elucidated by means the Examples and Comparative Experiment as given below.

EXAMPLE 1

Resin Preparation 176.4 g of formalin was charged in a reactor. The formalin was a solution of 37.0 wt. % formaldehyde in water, containing 0.8 wt. % methanol and 120 mg/kg of formic acid. The reactor contents were heated to 30° C. The pH was adjusted to 9 by using 2M NaOH. 133.6 g of melamine (supplier: DSM) was added. The reactor contents were heated from 30° C. to 95° C.; this took about 10 minutes. During this heating to 95° C., a clear resin was formed when the temperature in the reactor reached about 85° C., indicating that all of the melamine had dissolved. Subsequently, 50 g of urea was added, and the resin cooled down to 85° C. and kept there while the resin reacted further; meanwhile, the pH had dropped to 7. After reaching the Cloud Point—this was 15 minutes after dosing of the urea—the pH was increased to 8.8 by using 2M NaOH. Cloud point is defined as the point in time at which 1 drop of resin added to a large amount of water at 20° C. no longer directly dissolves but shows turbidity. Then, the resin composition was quickly cooled down to 20° C. so that it could be stored. The resulting resin composition had a molar $F/(NH_2)_2$ ratio of 0.90, a molar F/M ratio of 2.1, a solid content of 65 wt %, a viscosity of 50 mPas at 200, a Water Tolerance of 3 g water per g resin (at 20° C.) and a storage stability at 20° C. of more than 7 days. Water tolerance is defined as the amount of water (in gram) that can be added at 20° C. to 1 gram of resin before the resin turns turbid.

EXAMPLES 2-5

Plywood Preparation 75 g of the resin composition as prepared in Example 1 was used to prepare an adhesive by adding 4.6 g water, 2.25 g of a catalyst (20 wt. % formic acid in water) and 10.5 g wheat flour. The gel time of the adhesive was determined to be 67 s at 100° C. Gel time is defined as the time needed until gel formation when 5 grams of adhesive is put into a test tube kept in boiling water.

A 5-ply plywood was made from Red Meranti or Yellow Meranti, both with adhesive layers of 122 g/m² or 155 g/m² per adhesive layer. As is known to the skilled person, the term '5-ply plywood' means plywood essentially consisting of 5 wood veneer layers and 4 adhesive layers between the wood veneer layers. The Meranti's were conditioned at 11 wt. % moisture, and had a thickness of 0.6 mm (face layers) or 1.4 mm (middle layer). The plywood was prepared by first cold pressing during 30 minutes at 10 bar, followed by hot pressing during 10 minutes at 125° C. and 10 bar. The shear strength and F-emission were as follows:

| Example | Type of Meranti | Amount of adhesive layer (g/m²) | shear strength (kg/cm²) according to JAS | F-emission (mg/l) according to JAS |
|---|---|---|---|---|
| 2 | Red | 155 | 14 | 0.04 |
| 3 | Yellow | 155 | 18 | 0.23 |
| 4 | Red | 122 | 12 | 0.03 |
| 5 | Yellow | 122 | 12 | 0.18 |

Comparative Experiment 6953 g of formalin (37 wt. % F) was charged in a reactor, as well as 400 g melamin and 2300 g of urea. The pH was adjusted to 9 with a 2N NaOH solution. The reactor contents were heated to 95° C. and left at that temperature for 5 minutes. Then the pH was adjusted to 5.0 with a 2 N formic acid solution, after which the resin condensation reaction was continued until cloudpoint (at 30° C.) was reached. The reaction was stopped by adjusting the pH to 8.0 with a 2 N NaOH solution and cooling the reactor contents to 88° C.

Subsequently, 4025 g of melamine, 100 g of urea and 4635 g of formalin were dosed,; during this, it was ensured that pH remained at 8.0±0.3 and the temperature at 88±2° C. This resin condensation stage was continued for 70 minutes, while keeping the temperature at 88° C. and the pH between 8.0 and 8.5. The resin was then cooled to 78° C. 1600 g urea was added, so as to initiate a new condensation stage. During this stage, the pH dropped to 7.2. The stage was continued for about 35 minutes, until the viscosity of the resin reached 100 mPa.s (measured at 30° C.). The condensation was stopped by bringing the pH to 9.5 with 2 N NaOH and by cooling to 30° C.

1000 g of the resin composition as prepared was used to prepare an adhesive composition by adding 2 g of a catalyst ($NH_4Cl$, 0.3 wt. % dry/dry) and 140 g wheat flour. The gel time of the adhesive was determined to be 240 s at 100° C.

A 5-ply plywood was made from Red Meranti, with adhesive layers of 200 g/m² adhesive composition per adhesive layer. As is known to the skilled person, the term '5-ply plywood' means plywood essentially consisting of 5 wood veneer layers and 4 adhesive layers between the wood veneer layers. The Meranti was conditioned at 11 wt. % moisture, and had a thickness of 0.6 mm (face layers) or 1.4 mm (middle layers). The plywood was prepared by first cold pressing during 30 minutes at 10 bar, followed by hot pressing during 10 minutes at 125° C. and 10 bar. The shear strength was 8 kg/cm² and the average F-emission was 0.40 mg/l.

The Examples and Comparative Experiment clearly show that the plywood according to the invention has a lower F-emission than the known plywood; at the same time, the plywood according to the invention has a higher shear strength than the known plywood even though the adhesive layers in the plywood according to the invention had a lower amount of adhesive composition per adhesive layer than the known plywood.

The invention claimed is:

1. Plywood, comprising at least two wood veneer layers and at least one adhesive layer, whereby the adhesive layer comprises a resin composition comprising a triazine compound (T), formaldehyde (F) and optionally urea, characterized in that the molar $F/(NH_2)_2$ ratio of the adhesive layer lies between 0.70 and 1.10 and the molar F/T ratio of the adhesive layer lies between 1.0 and 3.5.

2. Plywood according to claim 1, wherein the triazine compound is melamine (M) and the molar F/M ratio of the adhesive layer lies between 1.0 and 3.5.

3. Plywood according to claim 2, wherein the molar $F/(NH_2)_2$ ratio of the resin composition lies between 0.70 and 1.10 and the molar F/M ratio of the resin composition lies between 1.0 and 3.5.

4. Plywood according to claim 2, wherein the molar $F/(NH_2)_2$ ratio of the adhesive layer lies between 0.80 and 1.05 and the molar F/M ratio of the adhesive layer lies between 1.0 and 3.5.

5. Plywood according to claim 4, wherein the molar $F/(NH_2)_2$ ratio of the resin composition lies between 0.80 and 1.05 and the molar F/M ratio of the resin composition lies between 1.0 and 3.5.

6. Plywood according to claim 2, wherein at least 60 wt% of the melamine in the adhesive layer and at least 40 wt% of the urea in the adhesive layer originates from addition during preparation of the resin composition.

7. Plywood according to claim 1, wherein the solids content of the adhesive layer prior to curing is at least 50 wt.%.

8. Plywood according to claim 1, wherein the amount of urea in the adhesive layer lies between 0 and 25 g/m² per adhesive layer.

9. Plywood according to claim 8, wherein the adhesive layer contains essentially no phenolic resin and wherein the adhesive layer contains essentially no pMDI resin.

10. Plywood according to claim 1, having an average F-emission according to JAS 987 2000 which is at most 0.5 mg/l.

11. Plywood according to claim 10, having an average F-emission according to JAS 987 2000 which is at most 0.3 mg/l.

12. Plywood according to claim 10, wherein the plywood has a shear strength according to JAS 987 2000 of at least 4kg/cm².

13. Plywood according to claim 1, wherein at least one wood layer contains yellow or red meranti.

14. Process for the preparation of plywood comprising at least two wood veneer layers and at least one adhesive layer, wherein the process comprises:
   a) preparing a resin composition comprising melamine (M), formaldehyde (F) and optionally urea;
   b) preparing an adhesive composition, comprising the resin composition and optionally other compounds, whereby the molar $F/(NH_2)_2$ ratio of the adhesive layer lies between 0.70 and 1.10 and the molar F/M ratio of the adhesive layer lies between 1.0 and 3.5;
   c) applying the adhesive composition to at least one side of a wood layer, whereby at least one adhesive layer is formed;
   d) bringing the at least one adhesive layer into contact with a second wood layer so that a plywood is formed;
   e) curing the plywood.

15. Process according to claim 14, wherein the adhesive composition is applied in step c) in an amount lying between 75 and 250 g/m² per adhesive layer.

16. Plywood, comprising at least two wood veneer layers and at least one adhesive layer, whereby the adhesive layer comprises a resin composition comprising a triazine compound (T), formaldehyde (F) and optionally urea, characterised in that the amount of urea in the adhesive layer lies between 0 and 25 g/m² per adhesive layer and in that the plywood has a shear strength according to JAS 987 2000 of at least 4 kg/cm².

17. Plywood according to claim 16, wherein the triazine compound consists essentially of melamine.

* * * * *